Sept. 28, 1965  F. F. PISK  3,208,175
GUN-MOUNTED WATER FOWL RETRIEVERS
Filed May 28, 1964  3 Sheets-Sheet 1
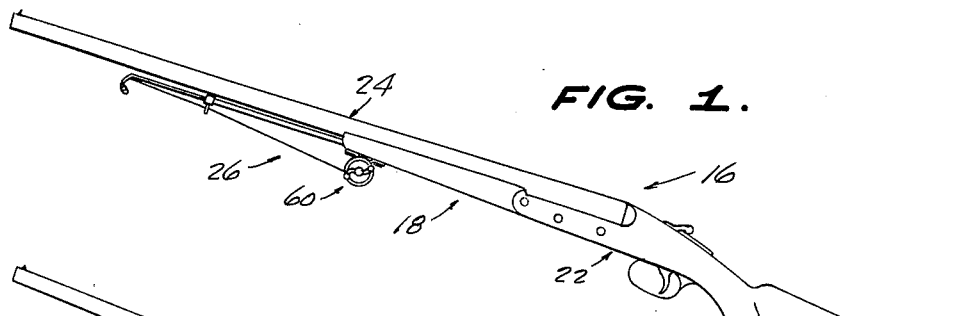
FIG. 1.
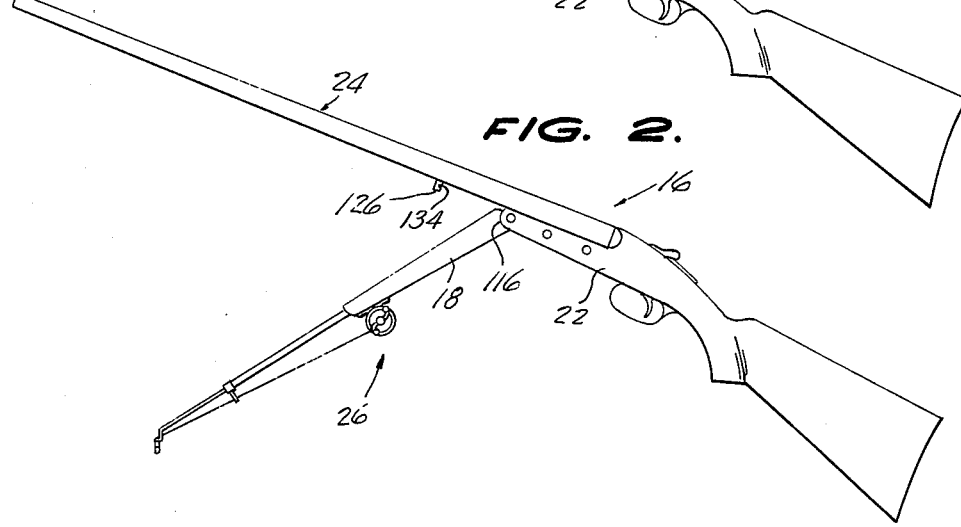
FIG. 2.
FIG. 3.
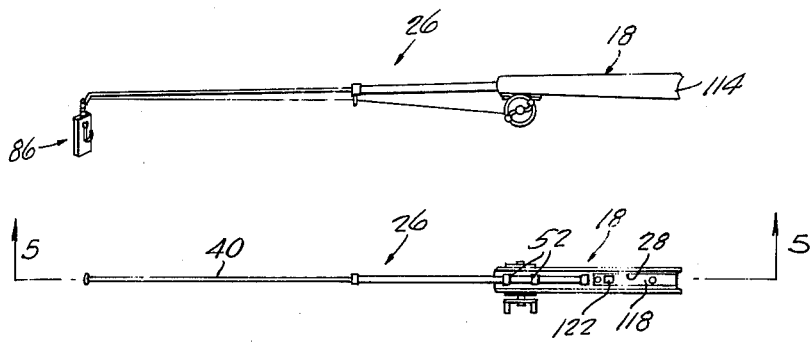
FIG. 4.
INVENTOR.
FRANK F. PISK,
BY
McMorrow, Berman & Davidson
ATTORNEYS.

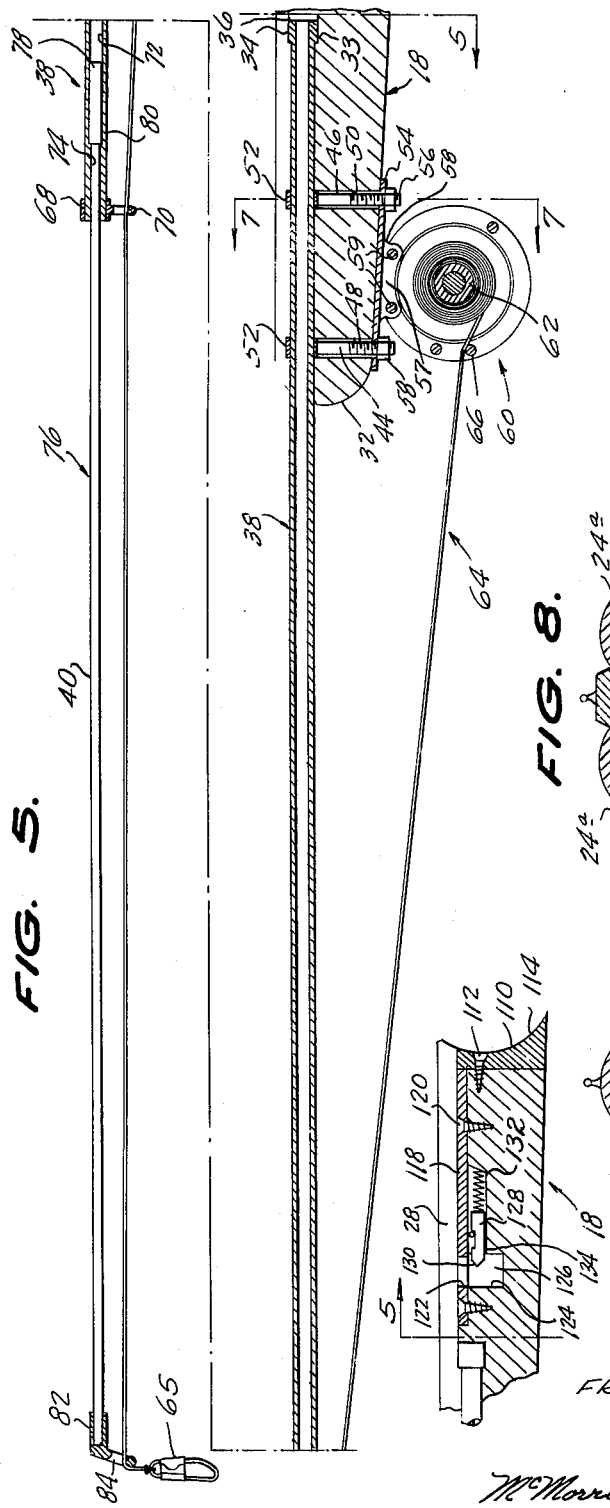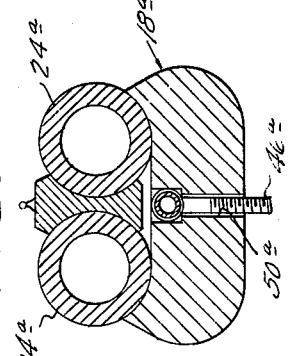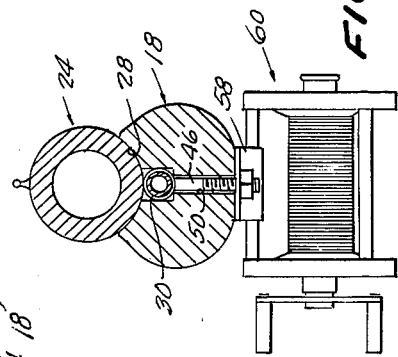
INVENTOR.
FRANK F. PISK,
BY
McMorrow, Berman & Davidson
ATTORNEYS Sept. 28, 1965  F. F. PISK  3,208,175
GUN-MOUNTED WATER FOWL RETRIEVERS
Filed May 28, 1964  3 Sheets-Sheet 3
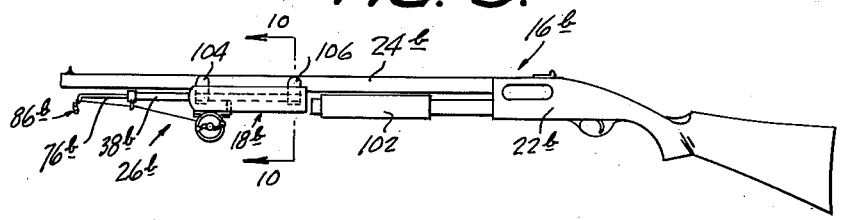
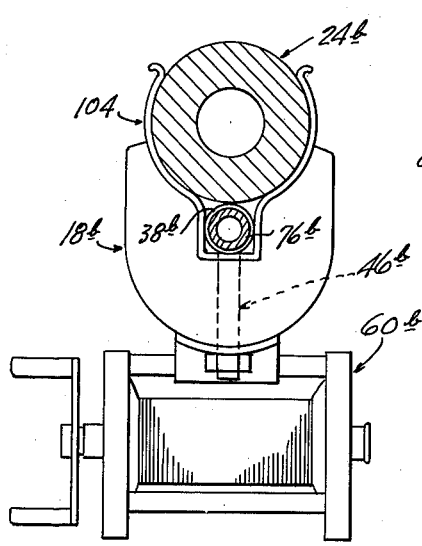
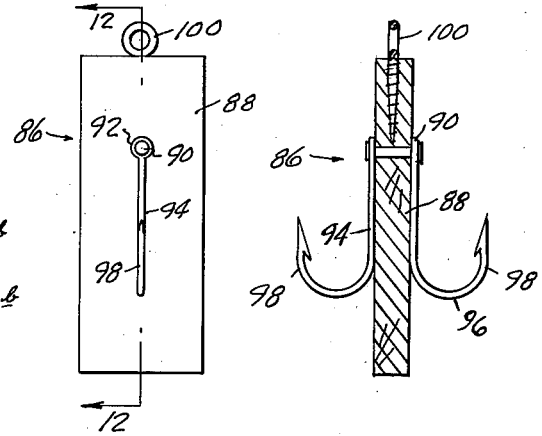
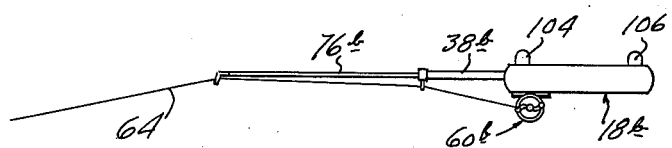
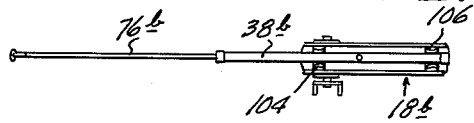
INVENTOR.
FRANK F. PISK,
BY
McMorrow, Berman & Davidson
ATTORNEYS.

United States Patent Office 3,208,175
Patented Sept. 28, 1965

3,208,175
GUN-MOUNTED WATER FOWL RETRIEVERS
Frank F. Pisk, Terry, Mont.
Filed May 28, 1964, Ser. No. 370,790
2 Claims. (Cl. 42—1)

This invention relates to gun-mounted water fowl retrievers.

The primary object of the invention is the provision of devices of the kind indicated, which enable a hunter to retrieve water fowl shot down into water, without requiring the use of a dog for this purpose. Where the purchase and maintenance of suitable retriever dogs are expensive or inconvenient, the devices of the present invention provide conveniently carried efficient, and economical retrieving means.

Another object of the invention is the provision of devices of the character indicated above, which can be readily adapted to guns of different kinds, and which can be permanently installed on guns, or removably and temporarily installed thereon.

A further object of the invention is the provision of devices of the character indicated above, which involve extensible rods rigged with weighted hooks on lines reeled on reels carried by the rods.

In the drawings:

FIGURE 1 is a side perspective view showing one form of device of the invention installed on a single barrel shot gun, the device being shown in retracted condition;

FIGURE 2 is a view, like FIGURE 1, showing the retriever device in operating position;

FIGURE 3 is an enlarged side elevation of said device, per se;

FIGURE 4 is a top plan view of FIGURE 3;

FIGURE 5 is an enlarged longitudinal section taken on the line 5—5 of FIGURE 4;

FIGURE 6 is an enlarged fragmentary side elevation of a mounting fixture for said device;

FIGURE 7 is an enlarged transverse section, taken on the line 7—7 of FIGURE 5;

FIGURE 8 is a view, like FIGURE 7, showing a double barrel shot gun mounting of the said device;

FIGURE 9 is a side elevation showing another form of retriever device removably installed on a pump gun;

FIGURE 10 is an enlarged transverse section taken on the line 10—10 of FIGURE 9;

FIGURE 11 is a side elevation of said other form of device, per se;

FIGURE 12 is a top plan view of FIGURE 11;

FIGURE 13 is an enlarged side elevation of a weighted hook assembly; and,

FIGURE 14 is a transverse section taken on the line 14—14 of FIGURE 13.

Referring in detail to the drawings, and first to FIGURES 1 to 8 thereof, the numeral 16 generally designates a single barrel shotgun, having a forward stock section or forepiece 18, which is removably secured to the fore end of a rear stock section 22, to swing downwardly from a normal horizontal position, engaged with a barrel 24, shown in FIGURE 1, to a forwardly and downwardly angled position away from the barrel, as shown in FIGURE 2.

The forward stock section 18 is utilized as the carrier of a permanently installed casting rod 26. As shown in FIGURES 4 to 7, the carrier 18 is formed with a concave longitudinal groove 28, in its upper surface, which, in the normal position of the section 18, receives the underside of the barrel 24. A relatively narrow parallel-sided longitudinal groove 30 is formed centrally in the bottom of the concave groove 28, which opens to the forward end 32 of the section 18. As shown in FIGURE 5, at the rear end of the groove 30, the same has an enlarged portion 33, which defines a stop shoulder 34 for engagement by an enlarged diameter terminal 36, on the rear end of the fixed tubular rear section 38, of an extensible rod 40.

The rear rod section 38 is anchored in place in the groove 30 by means of a fixture 42, shown in detail in FIGURE 6, which comprises a pair of similar downwardly extending forward and rear bolts 44 and 46, which extend down through forward and rear vertical bores 48 and 50, respectively, formed through the carrier 18, adjacent to the forward end of the latter. The bolts have rings 52, on their upper ends, which embrace the rear rod section 38.

As shown in FIGURES 5 and 7, a reel mounting plate 54, which is engaged with the underside of the carrier 18, has holes 56, through which the bolts extend, and nuts 58 are threaded on the bolts against the undersurface of the plate 54. The mounting plate 54 has a downwardly extending member 57, through which are secured upper cross rods 59 of a fishing reel 60, on whose core 62 is wound a line 64, which peels off the underside of the core and overlies a front cross rod 66 of the reel and extends forwardly therefrom and terminates in a snap 65.

The fixed rear rod section 38 extends forwardly from the carrier 18, and has a sleeve 68 secured on its forward end, which carries a pendant line guide 70, through which the line 64 is threaded.

As shown in FIGURE 5, the bore 72 of the rear rod section 38 has a reduced diameter forward end portion 74, through which slides an extensible forward rod section 76. The section 76 has an enlarged diameter rear end portion 78, which, in the extreme extended position of the forward section, makes stop engagement with the shoulder 80 defined by the reduced diameter bore portion 74.

The forward rod section 76 extends forwardly from the rear section 38 and has a socket 82, secured in its forward end, which has thereon a pendant line guide 84, through which the device 64 is threaded.

A weighted hook assembly 86 comprises, as shown in FIGURES 13 and 14, a vertically elongated, heavy gauge block 88, which can be of wood, which is centrally traversed, in its upper portion, by a headed rivet 90, which extends securably through the eyes 92, on the upper ends of the shanks 94, of fishing hooks 96, whose barbed crooks 98 extend laterally internally and upwardly from the block. The assembly 86 is connected to the snap 65 on the forward end of the line 64, by means of an upstanding eye 100, secured in the upper end of the block 88.

When not in use, the casting rod 26 is positioned up against the gun barrel 24, with the line 64 reeled in on the reel 60, and with the forward rod section 76 retracted into the rear rod section 38, in which position the device, especially when constructed of light weight materials, does not interfere with the accuracy and firing of the gun 16. In order to retrieve a shot water borne fowl, the device 26 is pulled down so as to release the tongue 126 from the notch 134, as shown in FIGURE 2, and then the forepiece 18 is detached from the rear stock section 22 releasing the device to the position shown in FIGURE 3, whereupon the device 26 is manipulated so as to cast the hook assembly 86 to and hook the fowl, and then pull in the fowl.

As shown in FIGURE 5, the forepiece 18 is adapted to be conventionally secured to the rear stock section 22, and has a plate 110 fixed, as indicated at 112, to its rear end. The plate 110 has a concave rear surface 114 which mates with a convex surface 116 on the forward end of the rear stock section 22.

A horizontal longitudinal plate 118 lies in the bottom of the barrel receiving groove 28 of the forward stock section, and is secured thereto, as indicated at 120. The plate 118 has a hole 122, adjacent to its forward end, which registers with a socket 124 in the forward stock section, into which a tongue 126 is adapted to drop, as the forward stock section 18 is raised up against the gun barrel 24. A forwardly spring pressed latch 128 has a double cam nose 130 which works through a slot 132 which opens to the rear side of the socket 124, and is adapted to engage retainably in a notch 134 in the rear side of the tongue.

In FIGURE 8 is shown an adaptation of the device 26, for a double barrel shotgun 16a which differs from the device of FIGURES 1 to 7 only in that the concave groove 28a is made wide enough to accommodate the width of the two barrels 24a.

FIGURES 9 and 12 show another form of device 26b, adapted for pump, bolt, or lever action guns. A pump gun 16b is shown, which has a forward end rearwardly movable member 102, located beneath its barrel 24b, which extends forwardly from its stock 22b. The device 26b is removably mounted on the barrel 24b forwardly of the member 102.

The device 26b comprises a relatively short carrier 18b, which, as shown in FIGURE 9 is removably mounted to the barrel 24b, by means of a pair of longitudinally spaced upstanding forward and rear U-shaped spring clips 104 and 106, respectively, instead of the carrier being hinged on the stock, as in FIGURES 1 to 7. Otherwise the construction of the casting rod device 26b is the same as illustrataed in FIGURES 1 to 8, with the components being given the same but differentiated numerals.

What is claimed is:

1. The combination with a gun having a stock a barrel extending forwardly from the stock, of a carrier located beneath the barrel and secured at its rear end to the forward end of the stock, said carrier having a forwardly extending tubular rear casting rod section fixed thereto, an extensible casting rod sliding in and extending forwardly from the rear section, line guides on said sections, a line reel mounted on the carrier, said reel carrying a line threaded through the guides, said line terminating in a weighted fishhook assembly, said carrier being formed with a concave groove adapted to receive the underside of the barrel in the storage position of the carrier, said concave groove being formed with a centered narrower longitudinal groove, said rear rod section being secured in said narrower groove.

2. The combination with a gun having a stock, a barrel extending forwardly from the stock, of a carrier located beneath the barrel and secured at its rear end to the forward end of the stock, said carrier having a forwardly extending tubular rear casting rod section fixed thereto, an extensible casting rod sliding in and extending forwardly from the rear section, line guides on said sections, a line reel mounted on the carrier, said reel carrying a line threaded through the guides, said line terminating in a weighted fishhook assembly, said carrier being formed with a concave groove adapted to receive the underside of the barrel in the storage position of the carrier, said concave groove being formed with a centered narrower longitudinal groove, said rear rod section being secured in said narrower groove, said carrier being formed with longitudinally spaced vertical bores opening to said narrower groove, bolts secured to the rear rod section and extending down though the bore, a reel mounting plate engaged with the underside of the carrier and traversed by said bolts, said reel being secured to the underside of the mounting plate.

References Cited by the Examiner

UNITED STATES PATENTS

| 1,002,657 | 9/11 | Duncan | 42—1 |
| 2,330,637 | 9/43 | Spagnolo | 42—86 |
| 2,471,231 | 5/49 | Miller | 43—1 |
| 2,498,749 | 2/50 | Benson | 42—71 |
| 2,671,289 | 3/54 | McCullough | 42—1 |
| 2,952,091 | 9/60 | Blanchard | 102—89 |

BENJAMIN A. BORCHELT, *Primary Examiner.*